Patented Apr. 24, 1928.

1,667,222

UNITED STATES PATENT OFFICE.

ERNEST J. SCHELLING, OF TOLEDO, OHIO.

DRESSING.

No Drawing.   Application filed January 12, 1925.   Serial No. 1,948.

This invention relates to compounds for treating friction and gripping surfaces.

This invention has utility for maintaining utility of power transmission belting and is especially useful in reclaiming the gripping action of brake band linings.

The composition of matter herein preferably comprises castor oil 19 parts and lard oil 1 part by volume. The two oils are agitated together at a temperature preferably just below their boiling point, which is above 212° F. at normal atmospheric pressure. It has been found the oils as herein handled at these proportions have a tendency when heat is applied to combine readily in producing a homogeneous product which does not separate upon cooling. Boiling of the mixture is not detrimental to the resulting composition nor does it tend to break up this product after it has once been prepared.

Leather belting in its use collects grease, dirt and other foreign substances which greatly decrease its efficiency and allows the belt to slip thus causing excessive heat which destroys the pliability and usefulness of the belting. The composition herein disclosed may be sparingly applied to the wear surface of the belting. This product loosens the foreign materials and softens the belt body thereby restoring the gripping action and adding life to the belt itself.

This composition is especially adapted to be used on brake linings of motor vehicles. The average brake lining is manufactured from closely woven non-combustible fabric as asbestos. As the brake lining is used, dirt and other foreign matter collects on the wear surface and the pressure to which the lining is subjected against the brake drum face, causes the brake lining to become coated with a hard almost metallic covering and the fabric to become impregnated with detrimental matter. From such causes the brakes tend to lose their gripping power thus heating up to a degree tending to detract from the life and utility thereof. The composition herein disclosed is composed of vegetable and animal oils, and when applied to the brake band surface, causes this hard coating to loosen up, and such cleansing action penetrates even into the lining itself.

The composition of matter herein disclosed not only cleanses the lining, but makes it pliable, expands the fibre to its original thickness and gripping power. The composition retains its cleansing and penetrating qualities for extended periods in its use as a dressing.

It has been found that variation in the proportions of the ingredients to any marked degree greatly decreases the efficiency of the composition. That is, if the proportion of vegetable oil is increased, the lasting usefulness is decreased while if the animal oil is increased, the holding or traction effort is decreased. However, the maximum efficiency of penetration, cleansing, and sealing or permanence are reached in the approximation of the disclosed proportions.

Heat will not deteriorate this composition as a dressing and due to this fact it can be safely used even on tight brake bands where heat is created by their use.

The dressing may be colored by the addition of iodine or other coloring substance and the odor may be hidden by the addition of a minute quantity of essential oil.

What is claimed and it is desired to secure by Letters Patent is:—

A brake band dressing composed of approximately 95% castor oil and 5% lard oil by volume.

In witness whereof I affix my signature.

ERNEST J. SCHELLING.